US006520292B1

(12) United States Patent
Kurtz et al.

(10) Patent No.: US 6,520,292 B1
(45) Date of Patent: Feb. 18, 2003

(54) APPARATUS FOR PACKING GREASE IN BEARINGS

(75) Inventors: Scotty R. Kurtz, Clarinda, IA (US); Marvin C. Negley, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 09/923,577

(22) Filed: Aug. 7, 2001

(51) Int. Cl.[7] .................... F16N 11/02; F16C 33/66
(52) U.S. Cl. ................................. 184/5.1; 184/28
(58) Field of Search ................. 184/5.1, 28, 38.1, 184/42, 105.1–105.3

(56) References Cited

U.S. PATENT DOCUMENTS

| 1,991,542 A | | 2/1935 | Cavanaugh | |
|---|---|---|---|---|
| 2,210,478 A | | 8/1940 | Berg | |
| 2,439,888 A | | 4/1948 | Ginter | |
| 3,717,222 A | * | 2/1973 | Moline | 184/5.1 |
| 4,190,133 A | * | 2/1980 | Ploeger | 184/5.1 |
| 4,405,035 A | * | 9/1983 | Shultz | 184/5.1 |
| 5,036,950 A | * | 8/1991 | Clark | 184/5.1 |
| 5,109,955 A | * | 5/1992 | Clark | 184/105.2 |
| 5,709,284 A | * | 1/1998 | Shultz, Sr. | 184/105.1 |
| 5,992,569 A | * | 11/1999 | Dawson | 184/28 |
| 6,247,554 B1 | * | 6/2001 | Pool | 184/5.1 |

OTHER PUBLICATIONS

MAC TOOLS, INC.; e–z squeeze bearing packer; Mac Tools Product Information Sheet and Warranty Card; Mac Tools, Inc. ; Washington Court House, Ohio.

* cited by examiner

Primary Examiner—Chong H. Kim
(74) Attorney, Agent, or Firm—Banner & Witcoff, Ltd.

(57) ABSTRACT

A grease bearing packer device includes a cylindrical container filled with grease into which a stem member including a piston and a concave frustoconical bearing support plate are positioned. A cap member with a convex bearing engagement plate is pushed toward the stem member to retain a bearing between frustoconical surfaces so that the assembly may be manually pushed into the grease filled container thereby causing grease to flow into a bearing retained between the plates.

7 Claims, 8 Drawing Sheets

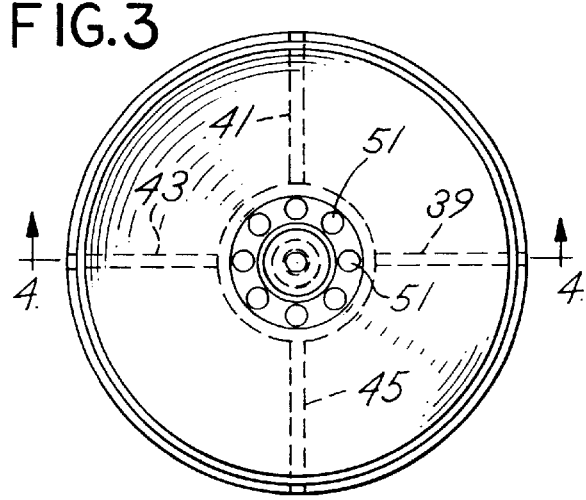
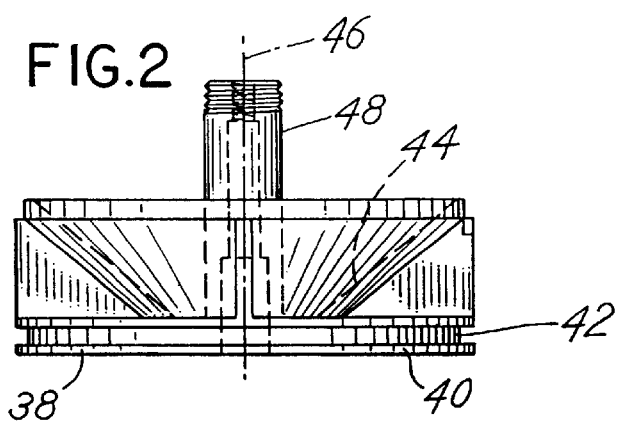
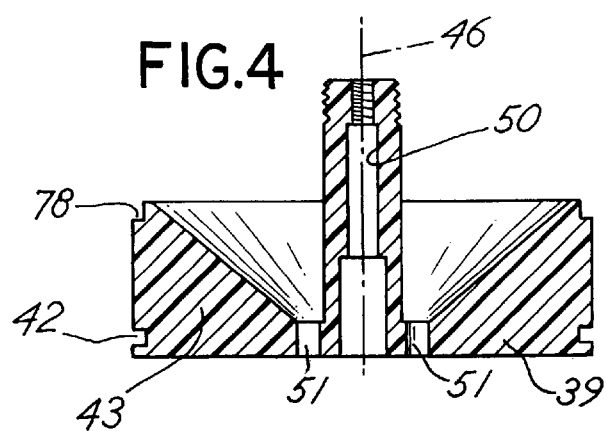

FIG. 17
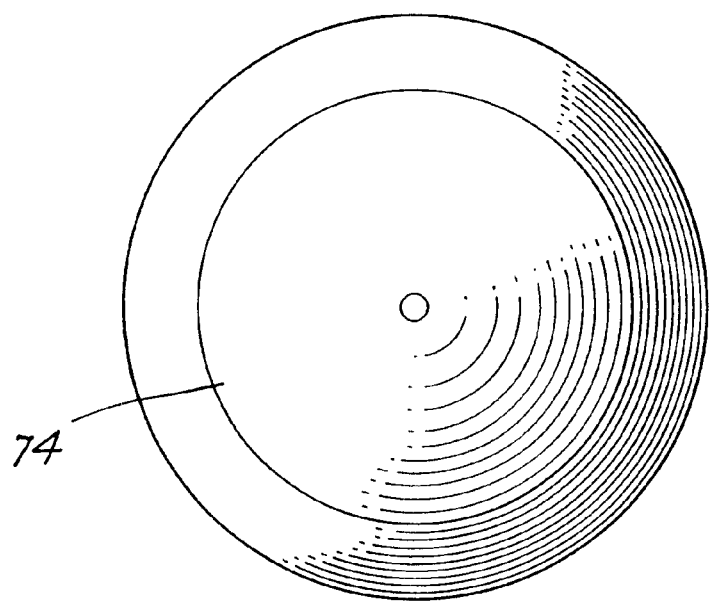
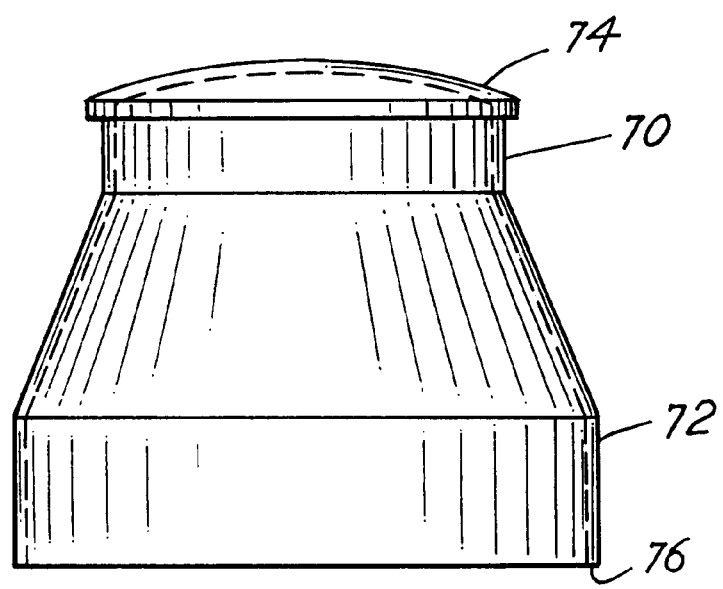
FIG. 16

APPARATUS FOR PACKING GREASE IN BEARINGS

BACKGROUND OF THE INVENTION

In a principal aspect the present invention relates to a grease packing device, and more particularly to a device for lubrication of bearings by packing the bearings with an appropriate grease or lubricant.

Bearings for vehicles and the like are typically mounted in cylindrical shaped raceways packed with grease or other lubricant. The lubricant or grease in the bearing requires replenishment or replacement from time to time. Devices have been available for many years directed to the purpose of packing bearings with grease including, for example, devices as depicted in U.S. Pat. No. 1,995,542 for A Means for Packing Bearings; U.S. Pat. No. 2,210,478 for a Lubricator; and U.S. Pat. No. 2,439,888 for a Bearing Packer.

Devices of the type disclosed in the prior art usually include a pair of opposed frustoconical plates, one of the plates having a generally concave shape and the other having a generally convex shape, so that when the plates are arranged in opposed relationship they provide a housing. The bearing, which is to be lubricated, is positioned between the plates and grease or lubricant is pumped into the region between the plates to replenish or replace the grease or lubricant in the bearing.

The prior art references disclose various devices of this type. Nonetheless there has remained the need for an improved device for packing grease into a bearing and, in particular, into a cylindrical bearing of the type typically used in combination with an axle or a shaft.

SUMMARY OF THE INVENTION

Briefly, the present invention comprises a grease bearing packer which includes a cylindrical container into which a separate cylindrical stem member is positioned. The stem member thus includes a piston slidably fitted into the container. The surface of the piston comprises a concave, frustoconical bearing support plate having an upstanding, axially centered post with a through passage that permits injection of grease into the container through the stem member post to the underside of piston. A separate cap member, which includes a convex frustoconical plate, is positioned in opposed relation to the concave frustoconical plate or piston of the stem member and maybe threadably attached to the stem member in order to pull the piston up for refilling the cup with grease. The piston can be removed and the cup manually filled or an alternate way of filling the cup with grease is to attach a grease gun to the grease-gun fitting at the outer end of the stem and pump the unit full of grease. The piston must be pulled up for either method. Openings or passages in the piston surrounding the stem member post permit the flow of grease into the region between the frustoconical plates and thus into a bearing member retained between the plates. Pushing downwardly on the cap member forces the cap member and stem member downwardly in the container thereby causing grease or lubricant within the container to flow upwardly openings or through the passages and into the bearing. A dust cover is provided to fit over the assembly and protect the contents of the container including the stem member and cap member. A compression spring may be provided to provide axial force to the piston to break vacuum when the cup becomes empty to aid in removing the piston when refilling with grease.

Thus it is an object of the invention to provide an improved bearing lubricant packer device fabricated from a minimum number of component parts and capable of being utilized to lubricate bearings of various sizes.

It is a further object of the present invention to provide a method for manufacture of a bearing packer utilizing plastic materials including glass filled polypropylene and foamed polypropylene materials.

Yet another object of the invention is to provide an improved bearing packer device which incorporates a container for the grease or lubricant for the bearing with, a cylindrical stem member and cap member which fit into the container and hold the bearing in position as grease or lubricant is injected into the bearing.

A further object of the invention is to provide a bearing lubricant packer device which may be made from molded plastic materials by injection molding processes wherein distortion of the component parts of the device is minimized as a result of the design of the device.

Yet another object of the invention is to provide a bearing lubricant packer device which includes a dust cover for protection of the device and the contents of the device including the lubricant and/or grease contained therein.

Another object of the invention is to provide a bearing lubricant packer device which includes a means for injecting lubricant or grease into a container for ultimate disposition into a bearing held by the device.

These and other objects, advantages, and features of the invention will be set forth in greater detail in the description which follows.

BRIEF DESCRIPTION OF THE DRAWING

In the detailed description which follows, reference will be made to the drawing comprised of the following figures:

FIG. 2 is an elevation of the stem member component of the bearing packer of the invention;

FIG. 3 is a top plan view of the stem member of FIG. 2;

FIG. 4 is a cross sectional view of the stem member of FIG. 3 taken along the line 4—4 in FIG. 3;

FIG. 16 is a front elevation of the dust cover member of the bearing packer of FIG. 1;

FIG. 17 is a top plan view of the dust cover member of FIG. 16;

DESCRIPTION OF THE PREFERRED EMBODIMENT

Figure 1:
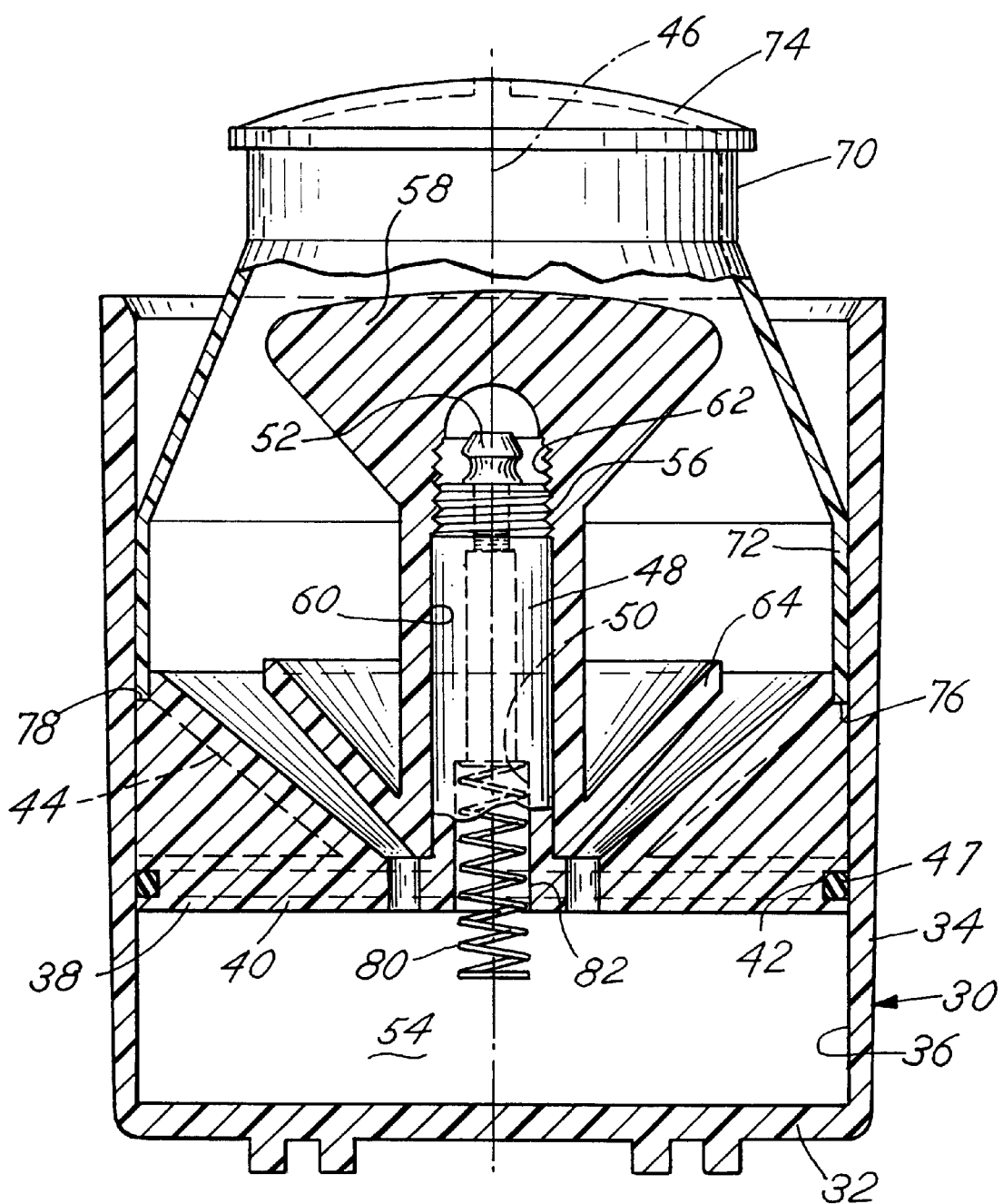
FIG. 1 is a cross sectional view of an assembled first embodiment of the bearing packer of the invention.
Figure 6:
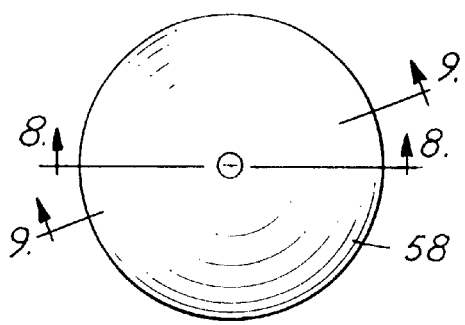
FIG. 6 is a top plan view of the cap member of FIG. 5.
Figure 5:
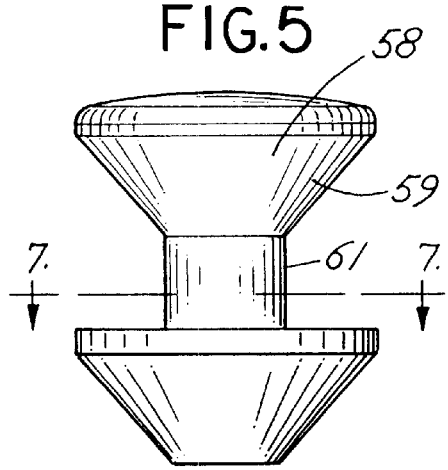
FIG. 5 is an elevation of the cap member component part of the bearing packer.
Figure 7:
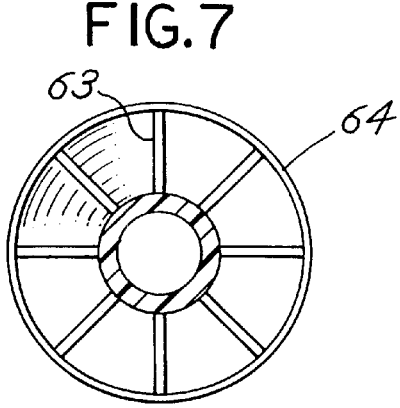
FIG. 7 is a cross sectional view taken along the line 7—7 in FIG. 5.
Figure 8:
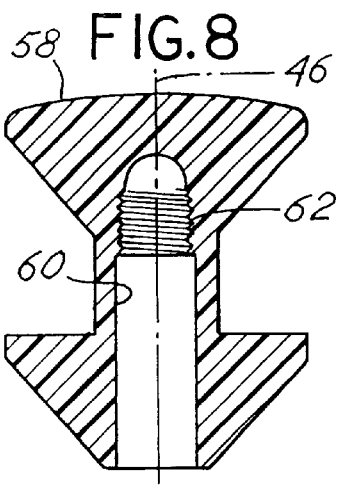
FIG. 8 is a cross sectional view taken along the line 8—8 in FIG. 6.
Figure 9:
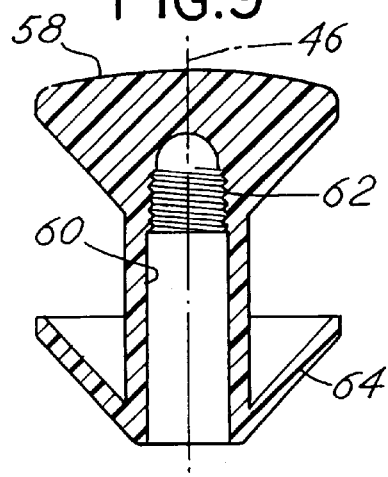
FIG. 9 is a cross sectional view taking along the line 9—9 in FIG. 6.

FIG. 1 depicts the component parts of the bearing lubricant packer device or apparatus of the invention wherein the component parts comprise a first embodiment. Though the basic component parts of the first embodiment are as depicted in FIG. 1, there are alternative designs for the various component parts as discussed hereinafter.

The grease or lubricant bearing packer comprises a cylindrical container 30 which has a bottom wall 32 and a cylindrical side wall 34 with an internal, constant diameter inside wall surface 36. Slidably positioned within the container 30 is a stem member 38. The stem member 38 includes a cylindrical piston 40 having a diameter that permits it to slidably move along the inside wall 36 of the container 30. An annular channel 42 in the peripheral edge of piston 40 receives an O-ring 43 to promote a sliding seal between the piston 40 and the container inside wall surface 36. The stem member 38 further includes a concaved shaped, frustoconical plate 44 molded on the top face of the piston 40. A center line axis 46 of stem member 38 is aligned with a center post 48 projecting upwardly and outwardly from the center of piston 40 and plate 44. The post 48 includes an axial throughbore 50. A grease fitting 52 is threaded into the upper end of the post 48 to provide an axial passage to the reservoir 54 within the container 30. The grease fitting 52 includes, preferably, a check valve that precludes flow of grease or lubricant outwardly through the top of the post 48 while permitting grease or lubricant to flow inwardly through the throughbore 50 into the reservoir 54. The top of the post 48 is threaded with external threads 56.

Referring therefore to FIGS. 2–4 there is illustrated in further detail the construction of the stem member 38. The stem member 38 is molded from a foamed 20% glass filled polypropylene plastic material in the preferred embodiment. Preferably the stem member 38 is made using a mold with various cores that result in a construction having a series of thin walls, webs and plates incorporated in the stem member 38. Such a mold avoids shrinkage and/or distortion of the final molded part and the resultant part is therefore deemed to be an important aspect and feature of the bearing packer device of the invention. Thus in the preferred embodiment the stem member 38 includes a series of four thin support walls 39, 41, 43, and 45 connecting piston 40 and plate 44 spaced at 90° intervals about the central axis 46. A series of axial openings on passages 51 are arrayed about the axis 46 at a radial distance therefrom and leading through the piston 40 adjacent each side of post 48 and adjacent the inner edge of the top of the concave plate 44. The openings 51 are for the passage of grease or lubricant from the inside of the container 30 into the region between plates 44 and 64. The angle between the bearing or top surface of the frustoconical plate 44 and the face of the piston 40 is typically in the range of 50° degrees ±10°, and piston 40 is perpendicular to axis 46 and post 48.

A cap member 58 includes a counterbore 60 with a threaded internal bore section 62 enabling the cap 58 to be threadably attached to the post 48. The cap 58 further includes a convex frustoconical plate 64 for positioning in opposition to the concave, frustoconical plate 44 of the stem member 38. Convex plate 64 has a lesser diameter extent than the diameter of piston 40. A bearing (not shown) is typically positioned between the plate 64 and the plate 44 to be packed with lubricant or grease. Thus, the bearing is placed over the post 48 when the cap member 58 is removed from the post 48. Thereafter, the cap member 58 is placed over the post 48 to retain and hold the bearing in position between plates 44 and 64. Post 48 is elongated to enable manual pushing of the cap member easily into the container 30. Thus, the axial extent of cap member 58 is preferred to be at least 50% of the height of the container 30.

The post 48 is threaded at its upper or outer end. The counterbore 60 is also threaded at its inner end so that the threads engage only when there is no bearing between the plates 44, 64. Thus when pushing on a handle 59 in the event a bearing is positioned between plates 44, 64, the threads of post 48 and counterbore 60 do not engage. Wear of the threads or breaking of the threads is thus avoided during a lubricant packing operation.

However, we do not need to remove stem member 38 to refill container 30 with lubricant, the cap member 58 may be threaded on to post 48 and both stem member and cap member 58 pulled from container, assisted by the spring 80 (described herein after). Of course in such event there is no bearing between plates 44, 64.

Removal of stem member 38 and cap member 58 and cap member 58 will then permit filling container 30. Also, if stem member is withdrawn to align piston 40 with the top of the container, then cap member 58 may be unthreaded to expose fitting 52. Lubricant may then be directed through fitting 52 and associated check valve incorporated therein to refill container 30 with lubricant.

Importantly, the positioning of the threads on stem 48 and counter bore 60 permit their function for piston 40 removal and lubricant replacement, while avoiding thread interaction when pushing on cap member 58 and lubricating a bearing. Spacing of plates 44, 64 by a bearing thus precludes thread engagement which is the desired objective and function.

A dust cover member 70 includes a cylindrical side wall 72 and a cap or crown 74. The cylindrical side wall 72 includes a lower edge 76 which fits against an annular recess 78 defined in the outer rim of the plate 44 of the stem member 38. The dust cover 70 is thus utilized to protect the contents within the container 30 but it is removed during the lubricant packing operation associated with packing a bearing retained between the plates 44 and 64.

A compression spring 80 is fitted within a counterbore 50 extending into the underside of piston 40 and provides a an axial force that resists the movement of the stem member 38 to a fully bottomed position within the container 30. Thus the compression spring 80 fits through an axial passage 82 in the piston 40 and into the counterbore 50. FIG. 1 illustrates the assembly of the various components. The remaining figures illustrate in greater detail the specific construction of those various components.

FIGS. 5–9 illustrate a first embodiment of the cap member 58. The cap member 58 includes a handle 59 with an intermediate stem 61 supported by and connected with the convex frustoconical plate 64. The cap member 58 is molded from a polypropylene plastic material which is 20% glass filled in the preferred embodiment. The mold is constructed so that the frustoconical plate 64 is supported by a series of webs extending between plate 64 and stem 61 such as web 63, spaced at 45° intervals about the center line axis 46. This construction eliminates or avoids distortion in the cap member 58 during the molding process. The frustoconical plate 64 preferably defines an angle with a horizontal plane perpendicular to the axis 46 in the range of 48°±10° in the preferred embodiment.

Figure 11:
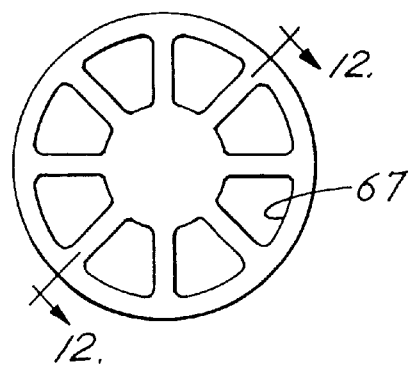
FIG. 11 is a top plan view of the cap member of FIG. 10.
Figure 10:
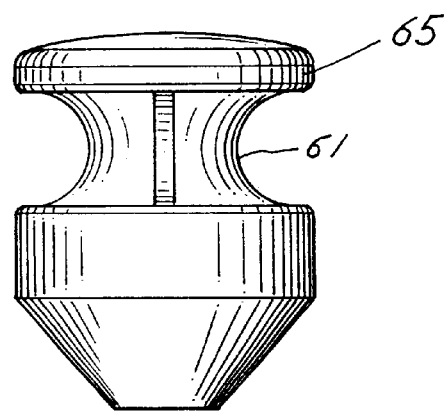
FIG. 10 is an elevation of an alternative cap member construction.
Figure 12:
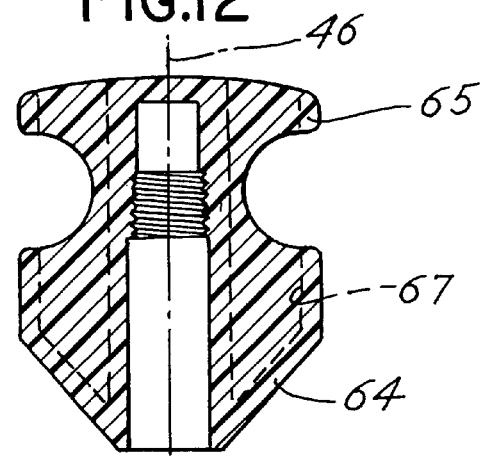
FIG. 12 is a cross sectional view taken along the line 12—12 in FIG. 11.

FIGS. 10–12 illustrate an alternative embodiment of a cap member 58. In this alternative embodiment a mold core is provided which fits through a top handle 65 thereby defining mold core passages 67 arrayed at 45° intervals about the center line axis 46 adjacent a central stem 61. The resultant frustoconical plate 64 thus is a thin wall, convex plate as previously described in order to avoid molding inconsistencies and distortion. The molded material utilized is polypropylene with a 20° glass filler which, as a result of the described design, maintains the desired shape and configuration in order to provide a handle 65 and plate 64 which do not distort.

Figure 13:
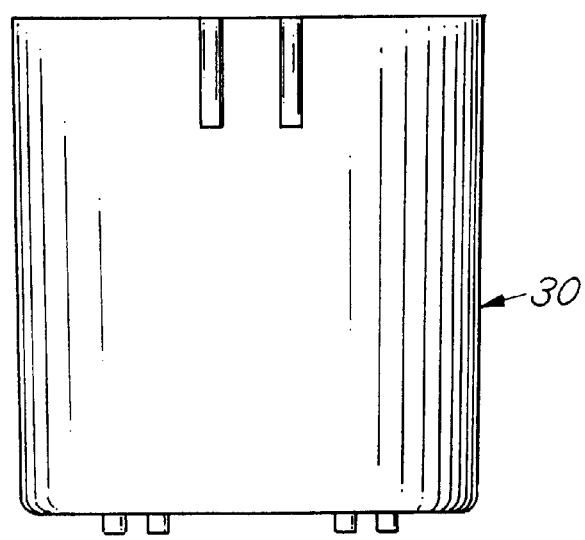
FIG. 13 is an elevation of the cylindrical container for the bearing packer of FIG. 1.
Figure 14:
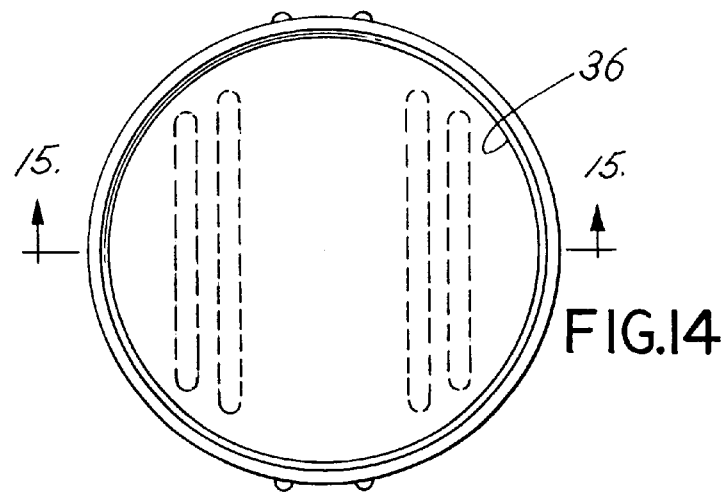
FIG. 14 is the top plan view of the container of FIG. 13.
Figure 15:
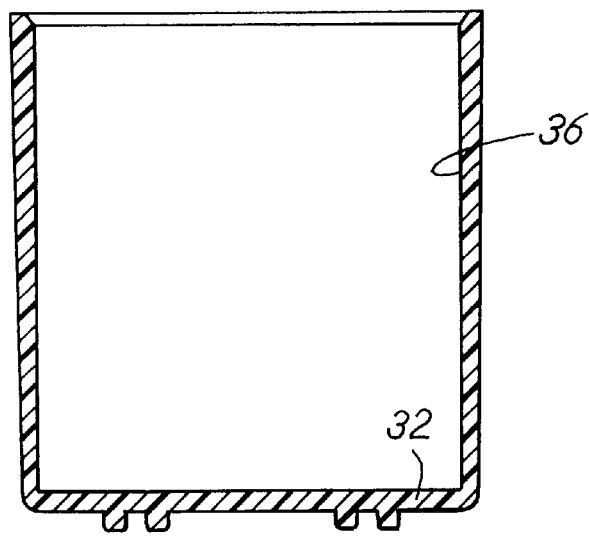
FIG. 15 is a cross sectional view taken along the line 15—15 in FIG. 14.

FIGS. 13–15 illustrate in greater detail the construction of the cylindrical container. FIGS. 16 and 17 illustrate the dust cover member previously described.

Figure 19:
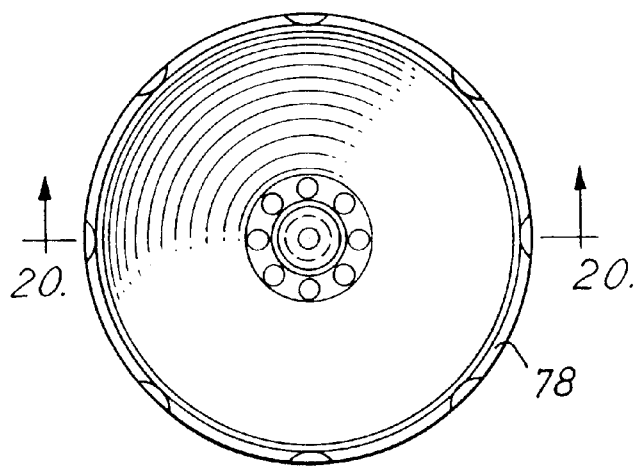
FIG. 19 is a top plan view of the alternative stem member of FIG. 18.
Figure 18:
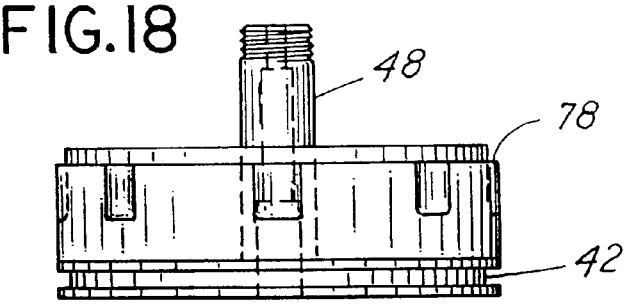
FIG. 18 is an elevation of an alternative stem member component for the bearing packer.
Figure 20:
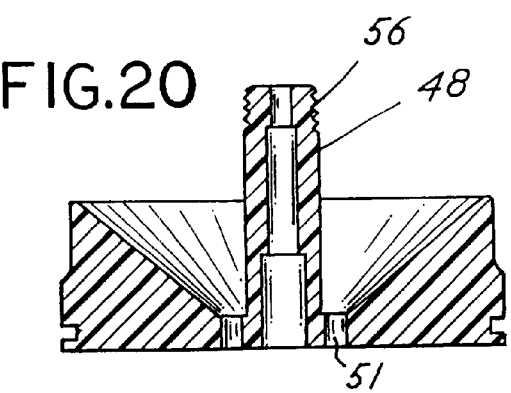
FIG. 20 is a cross sectional view along the lines 20—20 in FIG. 19.
Figure 22:
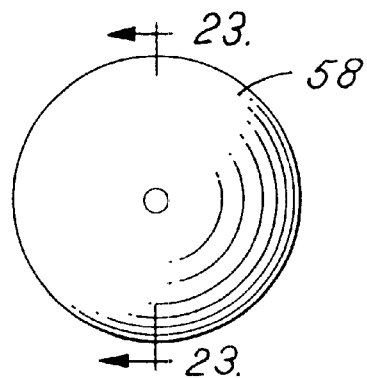
FIG. 22 is a top plan view of the cap member of FIG. 21.
Figure 23:
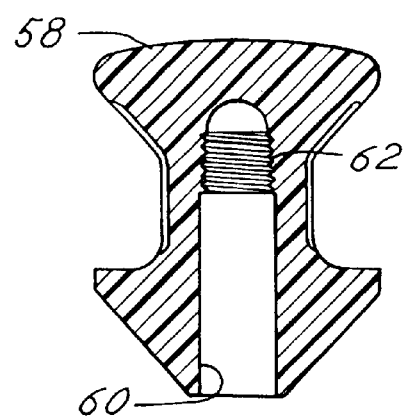
FIG. 23 is a cross sectional view taken along the line 23—23 in FIG. 22.
Figure 21:
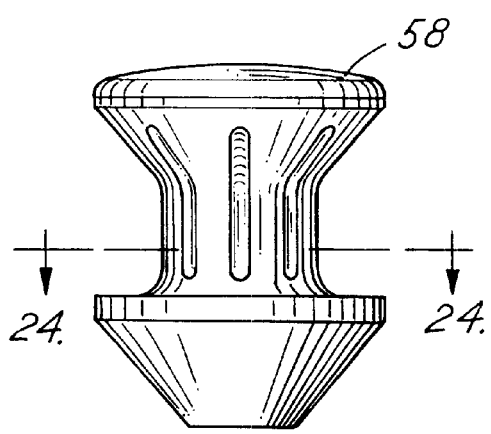
FIG. 21 depicts another alternative cap member component for the bearing packer in an elevation view.
Figure 24:
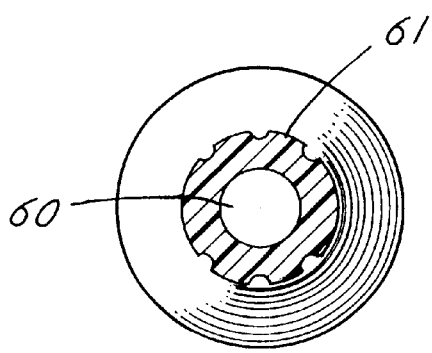
FIG. 24 is a cross sectional view taken along the line 24—24 in FIG. 21.

FIGS. 18–20 illustrate a further alternative embodiment of a stem member and FIGS. 21–24 illustrate an alternative embodiment of a cap member. The embodiments of FIGS. 18–24 are fabricated from foamed polypropylene material which is less subject to distortion and changes in shape during the molding process. Therefore, a principal distinction between the embodiments of the FIGS. 18–24 as contrasted with the prior described embodiments is the fact that cores are not necessarily utilized to provide for webs or plates that are thin walled. Rather the component parts stem 38 and cap member 58 may be molded as single solid component parts having the shape and dimensional characteristics desired to enable the manufacture of a bearing packer device.

Thus, the invention relates to a bearing packer device which has a minimum number of parts, which may be manufactured using conventional molding techniques and which provides an efficient means for retaining and holding a bearing in position between a pair or opposed frustoconical plates so that grease or lubricant may flow through openings defined in one of the plates into a bearing retained between the described plates. Thus it is possible that alternative embodiments incorporating the features of the invention may be provided. The invention is therefore to be limited only by the following claims and equivalents thereof.

What is claimed is:

1. A grease or lubricant bearing packer comprising, in combination:

a container with a cylindrical bore having a bottom, said bore for receipt of bearing lubricant;

a unitary, molded stem member including a lower cylindrical piston congruent with the cylindrical bore, said piston having a piston face opposed to the container bottom and a center axis perpendicular to the piston and container bottom, a plurality of fluid openings through the piston, said openings radially spaced from the axis, an axially, upwardly extending post from the piston with a throughbore through the piston and post, and a concave, frustoconical plate surrounding the openings and post for support of a bearing, said concave, frustoconical plate including a stem member peripheral rim generally congruent with the diameter of the piston;

a unitary, molded cap member including a center tube threadably engagable with the stem member post and a convex, frustoconical cap plate surrounding the center tube in opposed relation to the stem member frustoconical plate for retaining a bearing member between the frustoconical plates, said cap member plate having a cap member peripheral rim of lesser diameter than the diameter of the stem member peripheral rim, said tube closed at the top end thereof and including a unitary, integral, molded handle formed thereon for gripping in order to thread the cap member onto the stem member and depress the cap member in the container;

a dust cover member comprising a tubular section with an open lower peripheral edge and a cap section, said tubular section including a bottom peripheral rim congruent with the stem member peripheral rim; and a biasing spring intermediate the stem member and container bottom.

2. The packer of claim 1 wherein the stem member and cap member are each comprised of a single molded plastic element formed from a polypropylene material.

3. The packer of claim 1 wherein the stem member is comprised of a molded plastic material and wherein the concave frustoconical plate and the piston are integrally molded plate shaped elements.

4. The packer of claim 1 wherein the cap member is comprised of a molded plastic material and wherein the handle and convex frustoconical plate are integrally molded elements with axial core openings through the handle to prevent mold distortion.

5. The packer of claim 1 wherein the rim of the concave frustoconical plate includes a peripheral land for receipt and support of the lower edge of the dust cover member, said dust cover member having an external diameter fitted on the inside diameter of the cylindrical bore of the container.

6. The packer claim 1 including a check valve, grease fitting axially mounted on the post for injection of lubricant through said valve into the post throughbore and for preventing grease flow from the post throughbore.

7. The packer of claim 1 including a peripheral seal for the stem member piston against the bore of the container.

* * * * *